Figure 1:
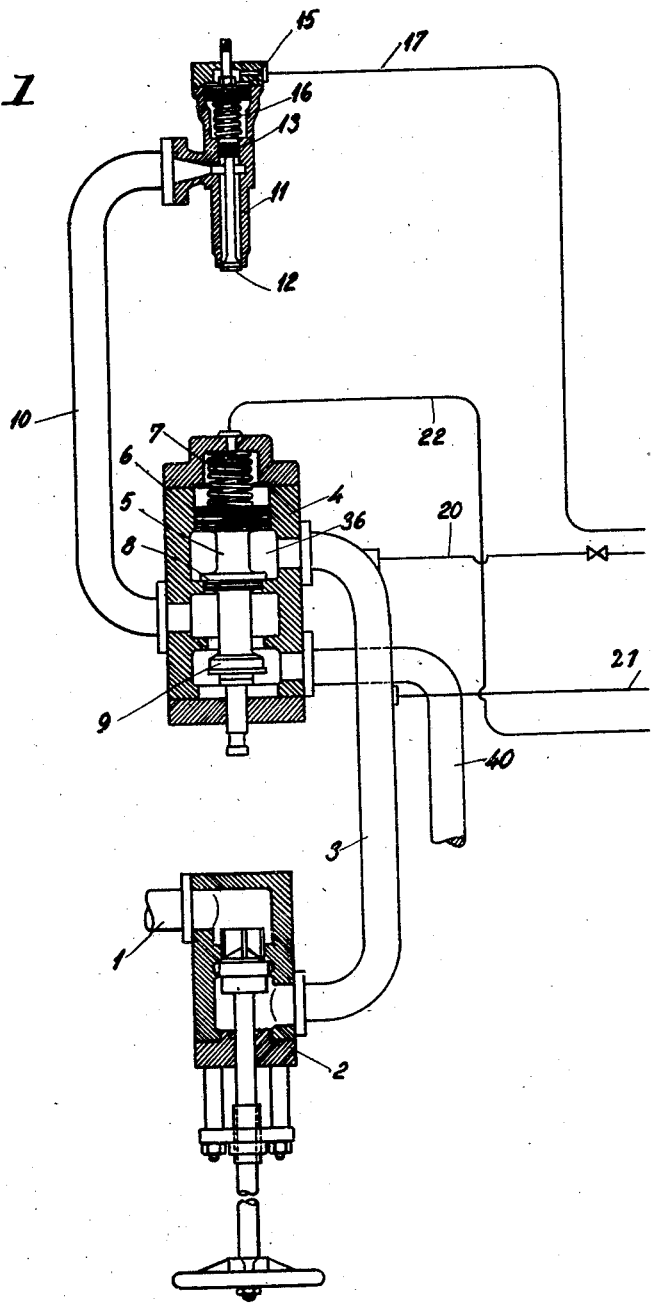

Inventors.
O. Petersen
S. H. Jensen

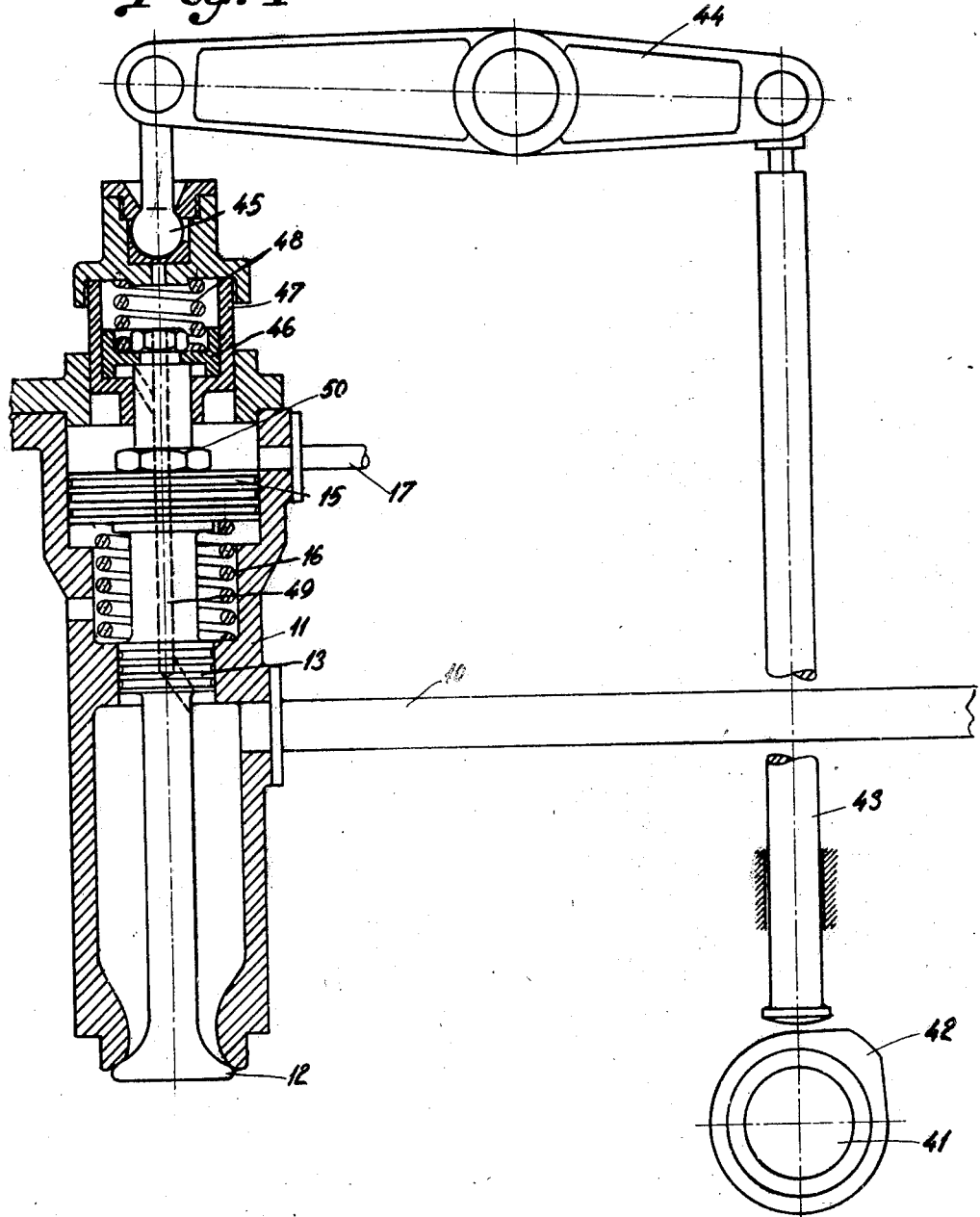

Patented July 27, 1943

2,325,538

UNITED STATES PATENT OFFICE 2,325,538

METHOD AND MEANS FOR OPERATING INTERNAL COMBUSTION ENGINES WITH SUPERCHARGE

Ove Petersen, Gentofte, and Svend Harald Jensen, Frederiksberg, Denmark; vested in the Alien Property Custodian Application April 24, 1941, Serial No. 390,200
In Denmark April 3, 1940

7 Claims. (Cl. 123—65)

This invention relates to internal combustion engines, especially two stroke engines, of the kind that are started by the blowing-in of a pressure medium, normally compressed atmospheric air, into the cylinders through starting valves placed in the latter.

It has often been desirable to be able to increase the output of an internal combustion engine by increasing the fresh-air charge for the cylinders, and this so-called supercharge of the cylinders with an extra amount of air besides the charge of scavenging- and charging air of nearly atmospheric pressure that remains at the end of the scavenging period may either be intended for constant use during the normal working of the engine, or it may be intended to be a means for making possible a temporary overloading of the engine. At all events there must, during or after the supply of the normal charge for the cylinder, be supplied a certain extra amount of air for effecting a supercharge, and to effect this various methods have been proposed.

It has for example been proposed to induce the supercharge air through special supercharge air ports which are supplied with supercharge air through a controlled valve, and which are placed so in the cylinder as to be covered by the piston during the combustion and the early part of the expansion stroke. This arrangement has also been adopted in such a way that the usual scavenging air ports placed in the vicinity of the outer dead point position of the piston are made higher than usual and after the scavenging proper are supplied with supercharge air through a controlled valve, while at the same time the admission of the scavenging air to the ports is cut off.

Both arrangements suffer, however, from various drawbacks. Comparatively early in the expansion stroke there will, e. g. occur a perceptible decrease of the cylinder pressure, the supercharge ports or the lengthened scavenging air ports being uncovered, so that the contents of the cylinder expand into the space behind these ports, and this causes a decrease of the output. Moreover it may be difficult to obtain sufficient room for the necessary port area, especially if piston-controlled exhaust ports should also be provided.

It has also been proposed to fit special supercharge valves through which the supercharge air may be blown in at a convenient pressure above that of the atmosphere, but this arrangement is somewhat complicated and difficult to carry into practice, because it is difficult to obtain sufficient room for the necessary valves such as fuel valves, safety valve, indicator valve, starting valve, exhaust valve, if any, and supercharge valve in the cylinder cover. This will also to a certain extent be the case when exhaust slides or exhaust pistons are used.

According to the invention these drawbacks are avoided by the supercharge air being blown in through the starting valves.

To make this possible the starting valves are provided with a special control which will, when the valves are no longer in communication with the starting air pipe, but are instead put in communication with a supply pipe for supercharge air, make them admit the supply of supercharge air during the early part the compression stroke at about the same time as the closing of the inlet- and outlet openings takes place. In order that it should not be necessary to use too highly compressed supercharge air the valves should be kept open as long as possible, but as the pressure in the cylinder rises rapidly on account of the compression and the blowing-in of the air the in-flow of air will, on the other hand, rapidly decrease on account of the increasing back pressure. It has proved advantageous to keep the supercharge valves open during so great a part of the upward stroke of the piston that the cylinder pressure on account of the compression will be increased by ½ to 2 atmospheres, it being then possible with a reasonable supercharge pressure to have the necessary amount of supercharge air introduced without it being necessary to increase the dimensions of the combined starting- and supercharge valves beyond reasonable limits. When the pressure of the supercharge air before the valves is then maintained so high that it is at least twice the pressure in the cylinders at the closing of the valves, one can be sure that during the whole of the supercharge period the air will be introduced at the highest possible velocity. According to this the pressure in the supercharge pipe may be maintained at about 3 atmospheres, and the amount of supercharge air supplied to each cylinder will amount to 10–20% of the stroke volume.

In practice the invention may be applied in most internal combustion engines provided with starting valves, irrespective of the construction and controlling of the starting valves, it being only necessary for carrying out the invention in practice to fit a change-over switch by means of which it may be switched from supply of starting air to a supply of supercharging air to the valves, and to alter or supplement the valve controlling members in such a way that the alteration of the motion of the valves necessary for the control of the supercharge may be effected.

According to an expedient embodiment of the invention the combined valves are during the starting controlled pneumatically in a way known per se, whereas, when during the working they act as supercharge valves, they may be controlled either mechanically or pneumatically. A mechanical control of the valves during the supercharging is especially applicable in engines that through prolonged periods or even during normal working are to employ supercharging, and it may, as will be explained in the following, easily be arranged so that the mechanical control is automatically put out of action as soon as the supply of starting air is switched on. A pneumatic control of the valves when these act as supercharge valves will, as will be known, give rise to an unadvantageously large air consumption and is therefore especially intended for application where the engine shall only be driven with supercharge during shorter top-load or overload periods. Here it will be an advantage that the pneumatic control is cheap and easily installed, it being possible to use most of the elements forming the pneumatic control mechanism employed during the starting, and at the best need only add an extra cam disc.

As a driving medium in the pneumatic control mechanism it will at all events be most expedient to use the starting air proper.

The invention is illustrated on the drawings on which

Figure 2:
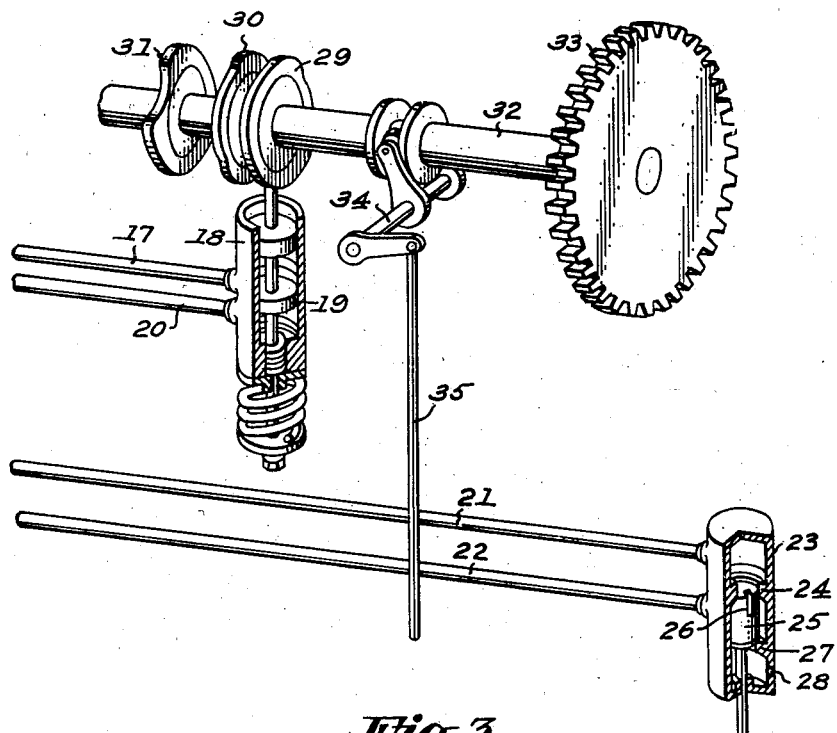
Figure 3:
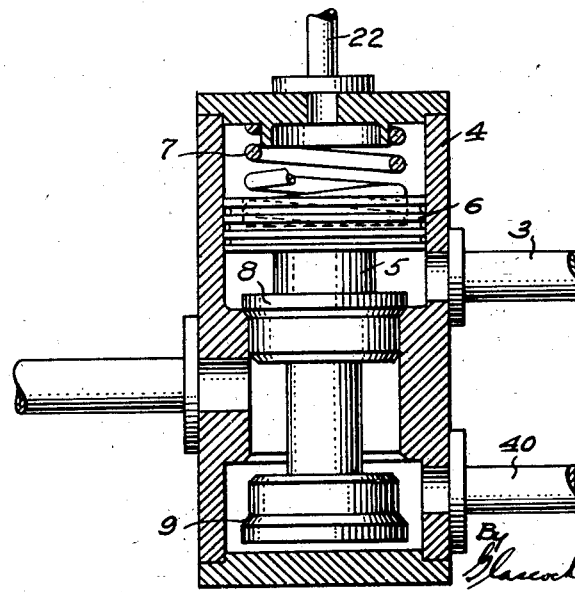

Figs. 1 and 2 diagrammatically and partly perspectively show the principal parts of a combined starting and supercharge unit with a wholly pneumatically controlled starting valve, and Figs. 3 and 4 show on a somewhat larger scale a section through a starting air slide and a starting valve with devices for mechanical supercharge control and pneumatic starting control.

1 in the unit shown in Figs. 1 and 2 designates a starting air main pipe leading from the usual starting air receiver, and from the cut-off valve 2 of the said main pipe a pipe 3 is leading to the usual starting air slide casing 4. This contains a double valve body 5 with a piston 6 sliding in a bore in the starting air slide casing and being under the strain from a spring 7, besides two valve parts 8 and 9 facing one another which co-operate each with its own valve seat. From the space between the latter issues a pipe 10 leading to the starting valves of the engine, only one of which being shown and designated by 11.

Each starting valve contains a valve body 12 with a pressure compensation piston 13 secured to the valve stem, and a piston 15 sliding in a bore in the slide valve casing, besides a closing spring 16. From the space above the piston 15 issues a pipe 17, which leads to the starting air distributor 18 of the particular cylinder, in which distributor a piston 19 controls the communication of the pipe 17 with the open air and a pipe 20 leading from the starting air pipe 3 respectively. The piston rod of the piston 19 may in the embodiment shown be made to co-operate with any one of three cam discs 29, 30, and 31 on a cam shaft 32, which may be shifted axially by means of a bell crank 34 and a pull-rod 35 leading to the starting platform.

From a compressor, not shown, which supplies supercharge air, a pipe 40 leads to the starting air slide casing 4.

From the starting air pipe 3 issues a pipe 21, which leads to the usual charge valve 23, Fig. 2, in which a piston 25 with a slot 26 by co-operation with a sealing belt 24 and a valve seat 27 may put a pipe 22 leading to the space above the piston of the starting air slide 6 in communication with the pipe 21 or with the open air through a vent 28.

The mode of action of the unit shown is the following, it being presumed that the engine has been stopped and is to be started for ahead working.

By means of the cut-off valve 2 is opened for the admission of starting air whereby the air passes through the pipe 3 to the space 36 above the valve member 8 in the starting air slide casing 4. At the same time the air passes through the pipe 21 and the slot 26 in the piston 25 of the charge valve 23 through the pipe 22 to the space above the piston 6 of the starting air slide and holds the double valve body 5 in the position shown on the drawing. When the reversing handle, not shown, of the engine is then put into the position for "ahead," the cam shaft 32 is shifted by means of the pull-rod 35 and the bell crank 34 so that the cam disc 30 is brought into line with the piston rod of the starting air distributor piston 19.

When the regulating handle, not shown, of the engine is then moved into the starting position, the piston 25 of the charge valve 23 is moved upwards so as to cover the slot 26, and a communication is effected from the pipe 22 through the valve seat 27 and the air vent 28 to the open air. Thereby the air pressure in the space above the piston 6 is released so that, on account of the action of the starting air pressure on the difference of areas between the piston 6 and the valve part 8, the double valve body 5 is pressed upwards and by means of the valve part 9 cuts off the communication from the supercharge air pipe 40 to the pipe 10 and instead puts the latter in communication with the starting air pipe 3. Starting air will consequently flow to the starting valves 11.

Through the pipe 20 the pressure of the starting air will moreover act on the underside of the piston 19 of the starting air distributor and presses against the action of a return spring, the piston rod of the said piston and against the corresponding cam disc. It being presumed that a withdrawn part of the circumference of the cam disc is in line with the piston rod of the starting air distributor, the distributor piston 19 is moved so much upwards that a communication is established between the pipe 20 and the pipe 17, and the starting air pressure will therefore be made to act on the upper side of the large piston 15 of the starting valve, so that the valve body 12 is opened against the action of the closing spring 16. The engine therefor starts running driven by the starting air, and as the cam shaft 32 by means of a gear wheel 33 is coupled to the control shaft, the distributor piston 19 and the corresponding distributor pistons of the other cylinders will be so moved by the corresponding cam discs that at the proper times they make the starting air pressure act in the space above the pistons 15 of the starting valves and put these spaces in communication with the open air, respectively, through an air-relieve opening in the distributor 18.

When the regulating handle is then moved further on for effecting the injection of the fuel, the piston 25 in the change valve 23 is moved back to the position shown on the drawings, whereby the starting air pressure is once more made to act on the upper side of the piston member 6 of the starting air slide, so that the supply of starting air to the starting valves is cut off, and next the starting air main pipe is cut off by means of the valve 2, whereby the whole starting air system shown is blown off.

The engine is now operated in the normal way, and when after this it be desired to let it work with supercharge, the cam shaft 32 is shifted by means of the bell crank 34 and the pull-rod 35 so that the cam disc 31 is brought in line with the piston rod of the distributor 18. Next the supply of supercharge air is admitted through the pipe 40 and the starting air slide, which is in the position shown on the drawings, and further on through the pipe 10 to the starting valves 11. The supercharging will now commence when the cut-off valve 2 is opened, whereby the pressure of the starting air will through the pipes 3, 20, and 17 open and close the valve body 12 under the control of the distributor 18.

In the embodiment shown in Figs. 3 and 4 it is presumed that the arrangement as far as regards the action and control of the starting valves during the starting is the same as described above, and corresponding parts have therefore been provided with the same reference numerals as those employed in Figs. 1 and 2.

As regards the starting valve 11 the principal difference is that it is here intended for being mechanically controlled when acting as supercharge valve.

For this purpose there is a cam shaft 41, and as such may be used a shaft already mounted on the engine. By means of a cam 42 this shaft actuates a tappet 43, which is connected through a rocker arm 44 and a ball joint 45 with the upper part of the valve spindle of the valve body 12, the said spindle having here been made telescoping. To the upper end of the valve spindle proper is secured a piston 46 which slides in a cylinder 47 connected to the ball joint 45, in which cylinder is fitted a spring 48 which will normally keep the piston in the position shown on the drawings in relation to the cylinder. From the space in the starting valve to which the air is admitted through the pipe 10 issues a bore 49 in the valve spindle, which bore opens into the cylinder 47 below the piston 46.

The mode of action of the arrangement here shown is as follows, it being presumed here, too, that the engine is stopped and is to be started.

After the starting air having been admitted in the usual way, the double valve body 5 of the starting air slide is moved upwards by relieving the pipe 22 of its air, and the starting air is from the pipe 3 admitted to the pipe 10 as previously described, while at the same time the supercharge air from the pipe 40 is cut off. The starting valve is controlled pneumatically through the pipe 17 as described above, and during this time the starting air is constantly admitted through the bore 49 to the lower part of the cylinder 47, so that its pressure against the action of the spring 48 keeps the cylinder drawn so far down on the upper end of the valve spindle that it is brought to rest against a shoulder 50 on the spindle. Hereby the tappet 43 is kept out of contact with the cam disc 42.

When the starting has been accomplished, and it is desired to operate the engine with supercharge, the same pressure is produced on both sides of the piston member 6 of the double valve body 5, so that the spring 7 holds the valve body in the position shown on the drawings, in which the starting air has been cut off, and the communication has been effected between the supercharge pipe 40 and the pipe 10. Hereby the space below the piston 46 is relieved of air through the bore 49 so that the spring 48 drives the piston to the bottom of the cylinder 47, whereby the tappet 43 is made to co-operate with the cam disc 42. The strength of the spring 48 is so adapted that under normal conditions it may transmit the power necessary for the opening of the valve body 12, so that after this the valve body 12 will be mechanically controlled from the cam shaft 41 against the action of the closing spring 16. The cam shaft 41 will thus control the admission of the supercharge air through the starting valves to the cylinders.

The invention is not bound to the embodiments here shown and described, which can only be considered as illustrating examples of possible practical constructions. Thus it is not necessary to supply the starting air and the supercharge air to each starting valve through the same pipe, it being possible to use a separate pipe for each kind of air, whereby the starting air slide 4 is omitted and substituted by other cut-off and change-over means. It is also possible to employ the invention in engines with mechanically controlled starting valves. The change-over to supercharge may then be effected by the control shaft of these valves being shifted, so that a special set of supercharge cams are put in action.

We claim:

1. A method of operating internal combustion engines having starting valves for admitting high-pressure starting air into the cylinders for starting purposes and means for cutting off the supply of starting air through the said valves into the cylinders during normal operation consisting in connecting the starting valves during normal engine operation to a source of low-pressure supercharging air and controlling them in such a manner as to admit the said low-pressure supercharging air into the cylinders upon conclusion of the normal scavenging and charging thereof.

2. A method of operating internal combustion engines having starting valves for admitting high-pressure starting air into the cylinders for starting purposes and means for cutting off the supply of starting air through the said valves into the cylinder during normal operation consisting in connecting the starting valves during normal engine operation to a source of low-pressure supercharging air and controlling them in such manner as to admit the low-pressure supercharging air into the cylinders upon conclusion of the normal scavenging and charging of the latter during an interval of time in which the normal compression of the charge in the cylinder would cause the cylinder pressure to increase with until 2 atmospheres.

3. A method of operating internal combustion engines having starting valves for admitting high-pressure starting air into the cylinders for starting purposes and means for cutting off the supply of starting air through the said valves into the cylinders during normal operation consisting in connecting the starting valves during normal engine operation to a source of low-pressure supercharging air and controlling them in such manner as to admit the low-pressure supercharging air into the cylinders upon conclusion of the normal scavenging and charging of the latter, and in supplying the supercharging air to the starting valves at a pressure which is substantially twice the pressure prevailing in the cylinder at the conclusion of the supercharging period.

4. An internal combustion engine having starting valves for admitting high-pressure starting air into the cylinders for starting purposes, means for cutting off the supply of starting air through the said valves into the cylinders at normal operation, means for connecting the starting valves with a source of low-pressure supercharging air during normal operation and means for controlling the starting valves in such a manner as to admit the said supercharging air into the cylinders upon conclusion of the normal scavenging and charging thereof.

5. An internal combustion engine having pneumatically controlled starting valves for admitting high-pressure starting air into the cylinders for starting purposes, means for cutting off the supply of starting air through the said valves into the cylinders at normal operation, means for connecting the starting valves with a source of low-pressure supercharging air during normal operation and a separate cam in the ordinary distributor mechanism of the pneumatic valve-controlled bar, the said separate cam being arranged to control the starting valves pneumatically for supercharging purposes in such a manner as to admit the low-pressure supercharging air into the cylinders upon conclusion of the normal scavenging and charging thereof.

6. An internal combustion engine having pneumatically controlled starting valves for admitting high-pressure starting air into the cylinders for starting purposes, means for cutting off the supply of starting air through the said valves into the cylinders at normal operation, means for connecting the starting valves with a source of low-pressure supercharging air during normal operation, means for rendering the said pneumatical valve-control gear inactive during normal engine operation and a mechanical valve-control gear for controlling the starting valves during normal operation in such a manner as to admit the low-pressure supercharging air into the cylinders upon conclusion of the normal scavenging and charging thereof.

7. An internal combustion engine as claimed in claim 6 in which the valve stem of each starting valve is made telescoping and comprises a piston sliding in a cylinder connected to a space in the valve housing to which the starting air has access during the starting period in such a manner that the action of the air pressure in the said cylinder will shorten the valve stem and thereby keep the mechanical valve-control gear inactive against the action of a spring.

OVE PETERSEN
SVEND HARALD JENSEN.